United States Patent [19]

Bailey et al.

[11] Patent Number: 4,759,459

[45] Date of Patent: Jul. 26, 1988

[54] FILLABLE TANK WITH FILLER PIPE RETAINER

[75] Inventors: Wallace O. Bailey, Northville; James E. Moroney, Detroit, both of Mich.

[73] Assignee: Ford Motor Company, Dearborn, Mich.

[21] Appl. No.: 36,141

[22] Filed: Apr. 6, 1987

Related U.S. Application Data

[63] Continuation of Ser. No. 692,148, Jan. 17, 1985, abandoned.

[51] Int. Cl.⁴ .............................................. B65D 25/00
[52] U.S. Cl. .................................. 220/86 R; 220/5 R; 220/465
[58] Field of Search ................... 220/86 R, 85 F, 85 S, 220/1 B, 5 R, 5 A, 70, 72, 465, 74

[56] References Cited

U.S. PATENT DOCUMENTS

| | | |
|---|---|---|
| 1,875,908 | 10/1929 | Zarobsky . |
| 2,545,178 | 2/1946 | Vaughn . |
| 2,779,498 | 9/1954 | Cole et al. . |
| 3,417,900 | 5/1967 | Landphair . |
| 3,464,584 | 9/1969 | McNally . |
| 3,825,145 | 7/1974 | Reynolds ........................... 220/70 X |
| 3,905,505 | 9/1975 | Gallay ........................... 220/86 R X |
| 4,134,510 | 1/1979 | Chang ................................ 220/72 X |
| 4,201,306 | 5/1980 | Dubois et al. ...................... 220/5 R |
| 4,234,098 | 11/1980 | Miller et al. . |
| 4,360,124 | 11/1982 | Knaus et al. ......................... 220/452 |
| 4,377,301 | 3/1983 | Craig et al. ...................... 285/189 X |
| 4,393,980 | 7/1983 | Armour et al. .................... 220/85 S |
| 4,526,286 | 7/1985 | Jung et al. ............................. 220/22 |

FOREIGN PATENT DOCUMENTS 0128504 6/1984 European Pat. Off. .
3213070 11/1982 Fed. Rep. of Germany ...... 220/1 B

*Primary Examiner*—Steven M. Pollard
*Attorney, Agent, or Firm*—Peter D. McDermott; Roger L. May

[57] ABSTRACT

A fillable tank is disclosed, which tank is adapted to cooperate with a filler pipe for conveying material into the tank. The tank comprises a tank wall and a filler pipe seat defining an opening through the tank wall, which opening is adapted to receive the filler pipe. The filler pipe seat comprises a frustro-conical shoulder to improve the retention of the filler pipe in the tank against pull-out forces. The smaller diameter end of the shoulder is inward of the larger diameter end which latter is integral with the tank wall. The frusto-conical shoulder comprises integral reinforcement ribs extending substantially longitudinally on the surface thereof. Optionally, the small diameter end of the shoulder may provide a radial surface adapted to bear against a radially outward extending annular bearing surface of the filler pipe to prevent pull-out of such filler pipe from the tank.

26 Claims, 3 Drawing Sheets

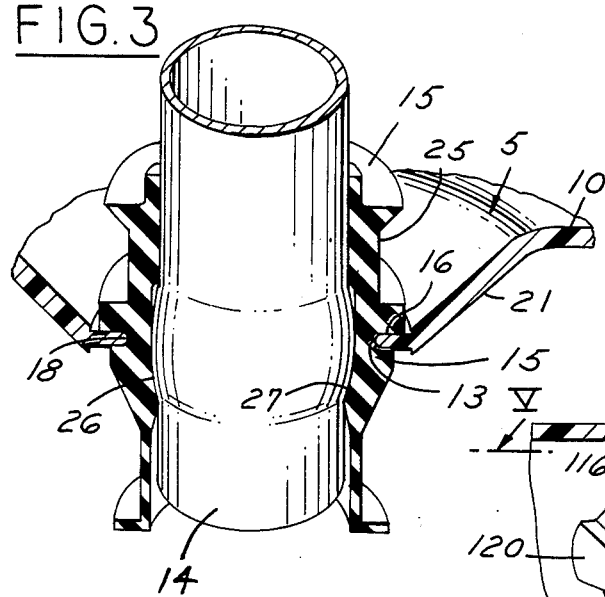
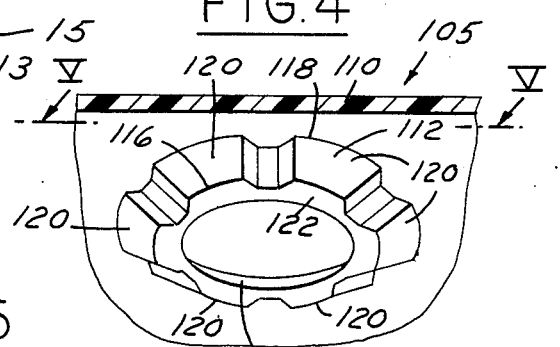
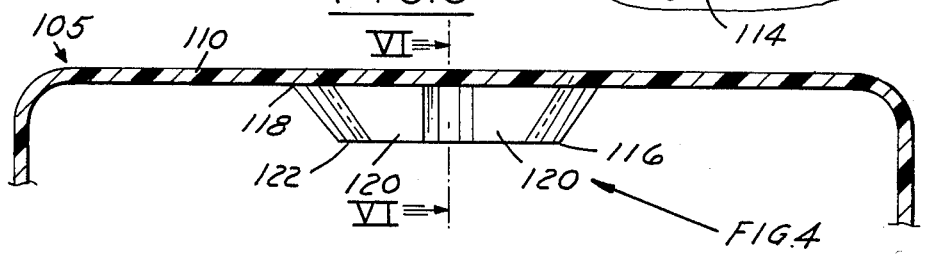
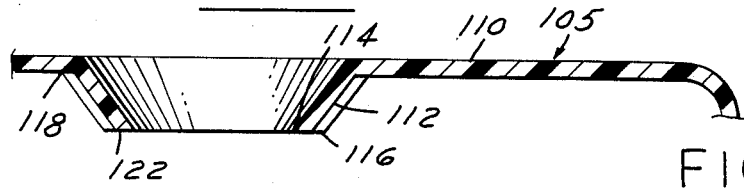
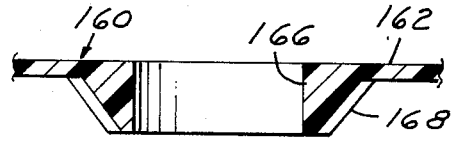
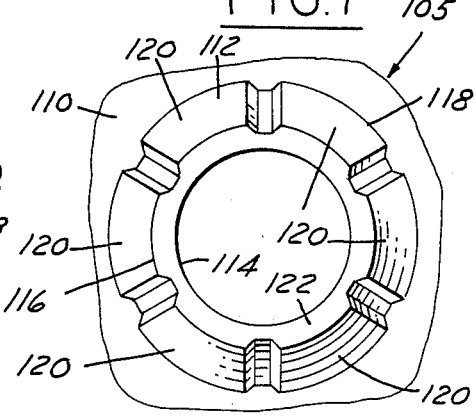

FILLABLE TANK WITH FILLER PIPE RETAINER

This application is a continuation, of application Ser. No. 692,148, filed Jan. 17, 1985, now abandoned.

TECHNICAL FIELD

This invention relates in general to a fillable tank adapted to cooperate with a filler pipe, which tank comprises a filler pipe seat for improving the retention of the filler pipe in the tank against pull-out forces. The invention is particularly applicable for use as a fuel tank and filler pipe assembly in a motor vehicle.

According to known tank and filler pipe designs, a filler pipe is inserted into the tank through a resilient grommet at the tank wall, with or without a support bracket between the filler pipe and the tank wall. Typically, the filler pipe serves to receive a nozzle, for example the nozzle of a gasoline pump hose, to convey fuel or other material into the tank. In many applications, such as the fuel tank of a motor vehicle, it is important that the filler pipe be securely attached to the tank. That is, it is important that the engagement of the filler pipe to the tank be able to resist pull-out forces likely to be applied to the filler pipe during use in its intended environment. Where the tank wall comprises a plastic material, such as polyethylene or other thermoplastic or a thermoset plastic, means are required for securing the filler pipe against being pulled out from the tank. Such means should require simple assembly and provide good durability in use.

A retainer for supporting and locating a fuel filler pipe relative to the fuel tank of a motor vehicle is disclosed in U.S. Pat. No. 4,377,301 to Craig et al, which patent is assigned to the assignee of the present invention, and the disclosure of which is incorporated herein by reference.

It is a primary object of the present invention to provide a fillable tank comprising means for retaining a filler pipe in the tank wall. Other objects, features and advantages of the invention will become more apparent from the following detailed description thereof, and from the accompanying drawings illustrating the preferred embodiments of the invention.

DISCLOSURE OF THE INVENTION

According to the present invention, a fillable tank, for example the fuel tank of a motor vehicle, or other fillable tank adapted to cooperate with means comprising a filler pipe extending into the tank for purposes of admitting fuel or other matter into the tank, comprises a tank wall and a filler pipe seat defining a fill port, that is an opening through the tank wall adapted to receive the filling means The filler pipe seat comprises a substantially rigid frustro-conical shoulder extending about at least a major portion of the circumference of the fill port. The larger diameter end of such shoulder is integral with the tank wall and the smaller diameter end thereof protrudes into the tank. The shoulder comprises substantially longitudinally (i.e., axially) extending integral reinforcement ribs. The small diameter end of the shoulder, at which the fill port is located, optionally may provide a radial surface adapted to bear against a radially outward extending annular bearing surface of the filling means to prevent pull-out of the filler pipe from the tank.

Fillable tanks comprising plastic material tank walls (e.g., high density blow-molded polyethylene) provided with a filler pipe seat comprising essentially an inverted cone with reinforcement ribs according to the invention are found to resist pull-out of the filler pipe from the tank against significantly greater pull-out forces than could be withstood by the tank wall without such filler pipe seat. While not wishing to be bound by theory, it presently is understood that upon application of pull-out forces to the filler pipe the filler pipe seat is caused to compress axially and radially inward toward the filler pipe and to disperse the pull-out forces to the surrounding tank wall largely in compression. Particularly plastic tank walls are known to be stronger or more structurally stable in compression than in tension. In any event it has been found that tank assemblies comprising filler pipe seats according to the present invention have significantly greater filler pipe pull-out resistance and, accordingly, are more durable than assemblies without such filler pipe seats.

BRIEF DESCRIPTION OF THE DRAWINGS

FIG. 3 is a side elevation view in cross-section of the fillable tank of FIG. 1 together with filling means comprising grommet and filler pipe according to a preferred embodiment of the invention.

FIG. 4 is a prespective view from inside a tank according to another embodiment of the present invention, showing a portion of tank wall and a filler pipe seat forming a fill port therethrough.

FIG. 5 is a side elevation view in cross-section of the filler pipe seat and tank wall (broken away) of the tank of Fig. 4.

FIG. 6 is a side elevation view in cross-section taken through line VI—VI of FIG. 5.

FIG. 7 is a bottom plane view of the filler pipe seat and tank wall (broken away) of the tank of FIG. 4.

FIG. 8 is a side elevation view taken in cross-section of a filler pipe seat and tank wall according to another embodiment of the invention.

DESCRIPTION OF PREFERRED EMBODIMENTS

Figure 1:
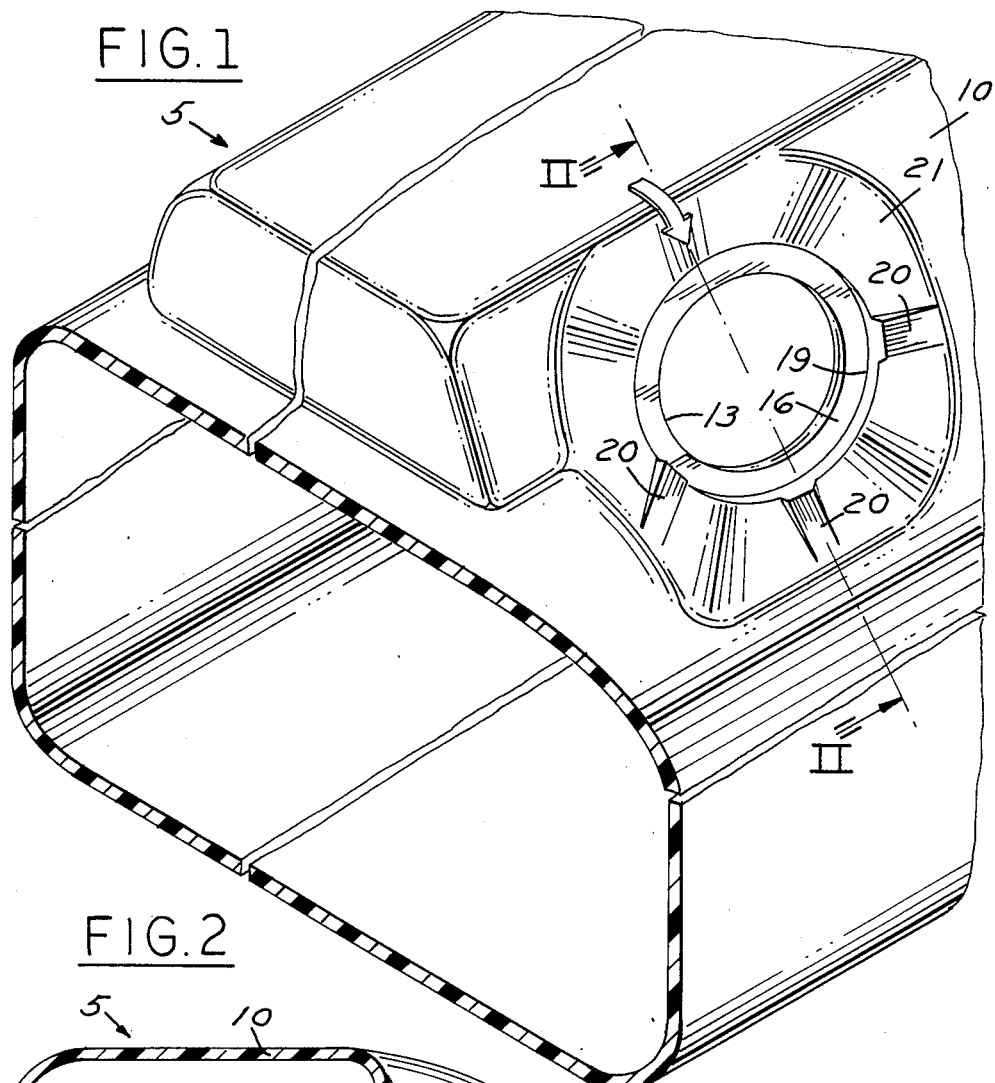
FIG. 1 is a respective view of a fillable tank, showing a portion of tank wall and a filler pipe seat forming a fill port therethrough according to a preferred embodiment of the invention.
Figure 2:
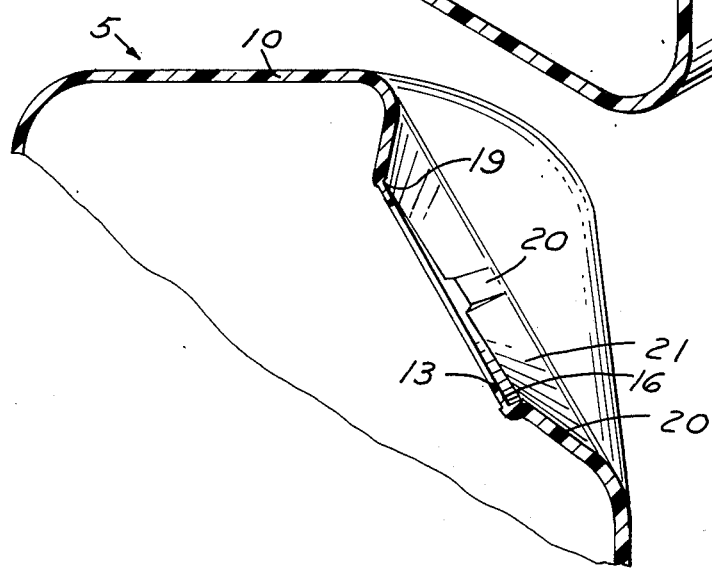
FIG. 2 is a side view of the fillable tank of FIG. 1, shown in cross-section through line II—II showing a portion of tank wall and filler pipe seat forming a fill port therethrough according to a preferred embodiment of the invention.

Referring now to FIGS. 1–3, a fillable tank 5 according to the invention is seen to comprise a tank wall 10. A concavity (as viewed from outside the tank) formed by the tank wall defines filler pipe seat 12 comprising fill port 13 adapted to receive means for filling the tank, specifically, a filler pipe 14 in conjunction with an elastomeric tubular grommet 15. The filler pipe seat is seen to comprise a frustro-conical shoulder projecting into the tank from the tank wall, with which it is unitary. The filler pipe seat further comprises strengthening ribs 20 extending longitudinally between the large diameter end 21 of the fzustro-conical shoulder to the small diamelez end 16. The ribs can comprise rigid members inserted into the wall of the shoulder or attached to the surface thereof or, more preferably, can be formed simply as a thickening of the wall or an upset or dislocation of the wall of the shoulder.

Referring particularly to FIG. 3, the grommet 15 is seen to receive coaxially filler pipe 14. Where the tank is to be used as a motor vehicle fuel tank, for example, the grommet should sealingly receive the filler pipe. To improve the seal between the grommet and the filler pipe, and/or to increase the resistance to axial dislocation of the filler pipe relative to the grommet (and, hence, relative to the tank), the outer surface of the grommet provides a circumferential recess 25 of substantially constant diameter adapted to receive a clamp, such as a hose clamp, to tighten the grommet about the filler pipe. According to preferred embodiments, to further improve resistance to axial dislocatin, the seal and/or resistance to axial dislocation, the filler pipe provides an upstanding bead or flange 26 circumferentially, optionally intermittently, which is received by corresponding inwardly opening circumferential recess 27 of the grommet. Regarding the engagement of the filler pipe seat by the grommet, the small diameter end 16 of the shoulder provides annular flange 17 which is adapted to be received by outwardly opening circumferential recess 18 of the grommet. Where a fluid tight seal is desired at the fill port, the flange 17 preferably is provided with machined surfaces 19 and 20 and recess 18 is closely toleranced to form a sealing engagement therewith.

Figure 9:
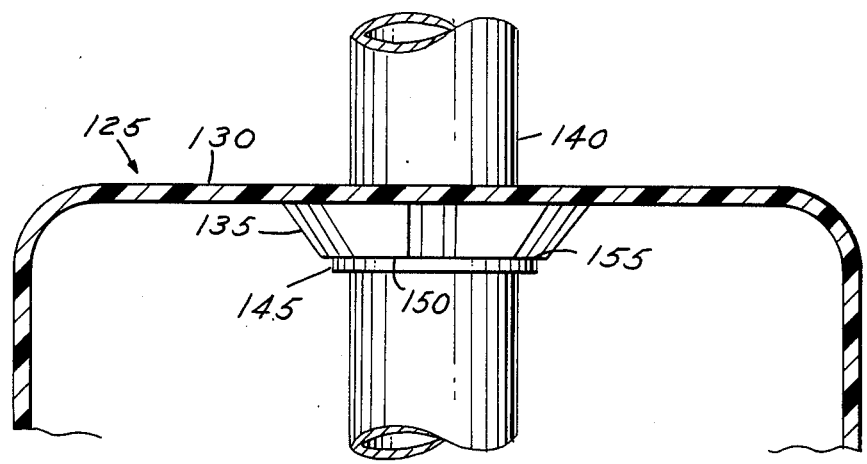
FIG. 9 is an elevation view, in cross-section, showing a fillable tank with filler pipe seat according to the invention, in assembly with a filler pipe.

Referring now to FIGS. 4–7, there is shown a tank 105 according to another embodiment of the invention. Tank 105 comprises tank wall 110 and filler pipe seat 112 defining an opening i.e. fi11 pozt 114, through the tank wall, which opening is adapted to eceive a filler pipe. The filler pipe seat 112 is seen to comprise a frustro-conical shoulder projecting into the tank from the tank wall. The smaller diameter end 16 of the shoulder is seen to be inward of the larger diameter end 118 of the shoulder, which larger diameter end is integral with and, more preferably, unitary with the tank wall 110. The outer surface of the shoulder is seen to comprise integral, and more preferably, unitary reinforcement ribs 120 comprising wall sections which are relatively thicker than the wall sections between such reinforcement ribs. The small diameter end 116 of the shoulder has a radial surface 122 which can be rounded or flat, which surface is adapted to bear against the filler pipe to hold the filler pipe against being pulled-out from the tank. Thus, the radial surface of the shoulder is adapted to bear against, for example, a radially outward extending annular bearing surface of the filler pipe. Such filler pipe bearing surface can be provided as an intermittent or continuous upstanding circumferential bead or as a radially extending circumferential flange unitary with the filler pipe or, for example, as a grommet forming a friction fit around the filler pipe. Referring particularly to FIG. 9, tank 125 is seen to comprise a tank wall 130 and filler pipe seat 135 defining a fill port, i.e., an opening through the tank wall, which opening receives filler pipe 140. The filler pipe is fitted with grommet 145 which bears against radial surface 150 of the small diameter end 155 of the filler pipe seat. For convenience of assembly, the filler pipe bearing surface can be circumferentially intermittent and the fill port can provide a corresponding key-way. Thus, the filler pipe could be inserted and then twisted about its axis to present axial dislocation of the filler pipe out of the tank.

As seen in FIG. 6, the inside surface of filler pipe seat 112 forms a frustro-conical surface.

Referring now to FIG. 8, an alternative embodiment is illustrated, wherein tank 160 comprises tank wall 162 and filler pipe seat 164. While the inner surface of the filler pipe seat in the embodiment of FIGS. 4–7 was seen to form a frustro-conical surface, in the alternative embodiment of FIG. 8 the inner surface 166 of the filler pipe seat 164 is seen to form a cylindrical surface.

A tank comprising a tank wall and filler pipe seat therein as described above can comprise any suitable material such as metal or plastic. It will be recognized, however, to be particularly advantageous for use in plastic tanks, especially plastic fuel tanks for motor vehicles, wherein enhanced resistance to axial dislocation of the filler pipe is particularly important. In any case, the tank material must be sufficiently strong for its intended use and resistant to chemical attack by the intended contents of the tank. For use as a motor vehicle fuel tank, for example, plastic material comprising in major part high density, high molecular weight polyethylene is known to the art. Suitable materials for the filler pipe also are well known and include, for example, metal and plastic. The bearing surface of the filler pipe can be formed in the case of a metal filler pipe, for example, by stamping or by welding or otherwise attaching a flange about the filler pipe. In the case of a plastic filler pipe the bearing surface can be unitary with the filler pipe, for example as when formed during blow-molding of a filler pipe. The filler pipe bearing surface, as noted above, also can be provided as a grommet comprising rubber or other resilient material forming a friction fit about the filler pipe.

We claim:

1. A fillable tank adapted to cooperate with means comprising a filler pipe extending into said tank for filling said tank, said tank comprising a tank wall and a filler pipe seat adapted to receive and fixedly locate said filling means, said filler pipe seat comprising a fill port through said tank wall and a substantially rigid frustro-conical shoulder extending from immediately proximate at least a major portion of the circumference of said fill port, the larger diameter end of said shoulder being integral with said tank wall and the smaller diameter end of said shoulder extending into said tank, said shoulder comprising longitudinally extending reinforcement ribs integral therewith.

2. The fillable tank of claim 1, wherein said shoulder is unitary with said tank wall.

3. The fillable tank of claim 2, wherein said reinforcement ribs are unitary with said shoulder.

4. The fillable tank of claim 2, wherein said shoulder is a concave displacement of said tank wall surrounding said fill port, having a wall thickness being substantially the same as that of said tank wall proximate said shoulder.

5. The fillable tank of claim 4, wherein said reinforcement ribs are formed unitarily with the surface of said shoulder.

6. The fillable tank of claim 2, wherein said shoulder has a wall thickness substantially greater than that of said tank wall proximate said shoulder.

7. The filler tank of claim 6, wherein said filler pipe seat forms an elongate cylindrical fill port having axial dimension at least about equal to the radius of said fill port.

8. The fillable tank of claim 1, wherein said fill port provides a key-way adapted to receive an intermittent, radially extending circumferential flange on the outer surface of said filler pipe.

9. The fillable tank of claim 1, wherein said tank wall and said filler pipe seat are formed unitarily of blow-molded plastic material.

10. The fillable tank of claim 9, wherein said plastic material consists of polyethylene.

11. A fillable tank adapted to cooperate with means comprising a filler pipe extending into said tank for filling said tank, said tank comprising a tank wall of high density polyethylene and a filler pipe seat adapted to receive and fixedly engage said filling means, said filler pipe seat comprising a fill port through said tank wall and a concave displacement of said tank wall forming a frustro-conical shoulder extending from immediately proximate at least a major portion of the circumference of said fill port, said shoulder comprising unitary reinforcement ribs.

12. A fillable tank comprising a tank wall, means comprising a filler pipe extending into said tank for filling said tank, and a filler pipe seat adapted to receive and fixedly engage said filling means, said filler pipe seat comprising a fill port through said tank wall and a substantially rigid frustro-conical shoulder extending from immediately proximate at least a major portion of the circumference of said fill port, the larger diameter end of said shoulder being integral with said tank wall and the smaller diameter end of said shoulder extending into said tank, said shoulder comprising longitudinally extending reinforcement ribs integral therewith.

13. The fillable tank of claim 12, wherein said shoulder is unitary with said tank wall.

14. The fillable tank of claim 13, wherein said reinforcement ribs are unitary with said shoulder.

15. The fillable tank of claim 13, wherein said shoulder is a concave displacement of said tank wall surrounding said fill port, having a wall thickness being substantially the same as that of said tank wall proximate said shoulder.

16. The fillable tank of claim 15, wherein said reinforcement ribs are formed unitarily with the surface of said shoulder within said tank.

17. The fillable tank of claim 13, wherein said shoulder has a wall thickness substantially greater than that of said tank wall proximate said shoulder.

18. The filler tank of claim 17, wherein said filler pipe seat forms an elongate cylindrical fill port having axial dimension at least about equal to the radius of said fill port.

19. The fillable tank of claim 12, wherein said tank wall comprises blow-molded plastic material.

20. The fillable tank of claim 12, wherein said tank wall and said filler pipe seat are formed unitarily of blow-molded plastic material.

21. The fillable tank of claim 20, wherein said molded plastic material consists of blow-molded polyethylene.

22. The fillable tank of claim 12, wherein said filling means further comprises a resilient tubular grommet having an outwardly opening circumferential recess adapted to receive the periphery of said fill port, said grommet being adapted to receive coaxially said filler pipe, a portion of said grommet extending axially outward of said circumferential recess being adapted to be clamped about said filler pipe to axially retain said filler pipe in said tank.

23. The fillable tank of claim 12, wherein said filler pipe provides a radially outward extending annular bearing surface and the smaller diameter end of said shoulder provides a radial surface adapted to bear axially against said filler pipe bearing surface.

24. The fillable tank of claim 23, wherein said bearing surface of said filler pipe comprises a flange unitary with said filler pipe.

25. The fillable tank of claim 23, wherein said filler pipe bearing surface comprises a grommet mounted circumferentially about said filler pipe and forming a friction fit therewith.

26. A fillable tank comprising a tank wall of high density polyethylene, means comprising a filler pipe extending into said tank for filling said tank, and a filler pipe seat adapted to receive and fixedly engage said filling means, said filler pipe seat comprising a fill port through said tank wall and a concave displacement of said tank wall forming a substantially rigid frustro-conical shoulder about at least a major portion of the circumference of said fill port, the larger diameter end of said shoulder being integral with said tank wall and the smaller diameter end of said shoulder extending into said tank, said shoulder comprising longitudinally extending unitary reinforcement ribs, said filling means further comprising a resilient tubular grommet having an outwardly opening circumferential recess adapted to receive the periphery of said fill port, said grommet being adapted to receive coaxially said filler pipe, a portion of said grommet extending axially outward of said circumferential recess being adapted to be clamped about said filler pipe to axially retain said filler pipe in said tank.

* * * * *